US012802710B2

(12) United States Patent
Wichern et al.

(10) Patent No.: US 12,802,710 B2
(45) Date of Patent: Nov. 17, 2026

(54) COMPARING AUDIO SIGNALS WITH EXTERNAL NORMALIZATION

(71) Applicant: Mitsubishi Electric Research Laboratories, Inc., Cambridge, MA (US)

(72) Inventors: Gordon Wichern, Boston, MA (US); Dimitrios Bralios, Urbana, IL (US); François G Germain, Quincy, MA (US); Jonathan Le Roux, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 298 days.

(21) Appl. No.: 18/502,918

(22) Filed: Nov. 6, 2023

(65) Prior Publication Data

US 2025/0124944 A1 Apr. 17, 2025

Related U.S. Application Data

(60) Provisional application No. 63/589,645, filed on Oct. 12, 2023.

(51) Int. Cl.

*G10L 25/51* (2013.01)
*G10L 25/18* (2013.01)
*G10L 25/30* (2013.01)

(52) U.S. Cl.

CPC .............. *G10L 25/51* (2013.01); *G10L 25/18* (2013.01); *G10L 25/30* (2013.01)

(58) Field of Classification Search

CPC .......... G10L 25/51; G10L 25/18; G10L 25/30
See application file for complete search history.

(56) References Cited

U.S. PATENT DOCUMENTS 9,305,264 B2 * 4/2016 Anguera ................. G10L 15/12
11,915,689 B1 * 2/2024 Agostinelli ............. G10L 13/00
(Continued)

FOREIGN PATENT DOCUMENTS

CN 117292689 A * 12/2023 ............. G10L 17/02
EP 3570186 A1 * 11/2019 ........... G06F 16/683
KR 20230079503 A * 6/2023 ............. G10L 25/03

OTHER PUBLICATIONS

McHargue, Efficient Multispeaker Speech Synthesis and Voice Cloning, Thesis, Case Western Reserve University, 2023 (Year: 2023).*

(Continued)

*Primary Examiner* — Bhavesh M Mehta
*Assistant Examiner* — Eunice Lee
(74) *Attorney, Agent, or Firm* — Gene Vinokur

(57) ABSTRACT

An audio processing system is disclosed for comparing a query audio sample with a database of multiple reference audio samples using an external normalization. The system includes at least one processor and memory storing instructions that, when executed by the processor, cause the system to determine a bias term of the external normalization based on a spectro-temporal pattern of the query audio sample. The system further compares the query audio sample with each of the reference audio samples to generate a similarity score for each comparison. The system combines the bias term with each of the similarity scores to produce normalized similarity scores. The normalized similarity scores are then compared with a threshold to generate a result of comparison, which is subsequently outputted.

15 Claims, 14 Drawing Sheets

(56) References Cited

U.S. PATENT DOCUMENTS

| | | | | |
|---|---|---|---|---|
| 12,093,648 | B2 * | 9/2024 | Lauber | G06F 40/30 |
| 12,327,551 | B1 * | 6/2025 | Chen | G10L 15/1815 |
| 2002/0181711 | A1 * | 12/2002 | Logan | G11B 27/28<br>381/1 |
| 2015/0039640 | A1 * | 2/2015 | Garrett | G06F 16/683<br>707/758 |

OTHER PUBLICATIONS

Yalova et al., Automatic Speech Recognition System with Dynamic Time Warping and Mel-Frequency Cepstral Coefficients, Colins, 2023 (Year: 2023).*

Bergsma et al., Cluster-based pruning techniques for audio data, arXiv:2309.11922, 2023 (Year: 2023).*

G. Somepalli, V. Singla, M. Goldblum, J. Geiping, and T. Goldstein, “Diffusion art or digital forgery? Investigating data replication in diffusion models,” in Proc. CVPR, 2023, pp. 6048-6058.

E. Pizzi, S. D. Roy, S. N. Ravindra, P. Goyal, and M. Douze, “A self-supervised descriptor for image copy detection,” in Proc. CVPR, 2022, pp. 14 532-14 542.

P. Cano, E. Batle, T. Kalker, and J. Haitsma, “A review of algorithms for audio fingerprinting,” in Proc. MMSP, 2002, pp. 169-173.

* cited by examiner

COMPARING AUDIO SIGNALS WITH EXTERNAL NORMALIZATION

TECHNICAL FIELD

The present disclosure generally relates to audio signal processing and more particularly to systems and methods for comparing audio signals.

BACKGROUND

Previous approaches for comparing audio samples with a database of reference audio samples have typically relied on traditional audio processing techniques. These approaches often involve analyzing the audio samples using various signal-processing algorithms to extract relevant features such as spectral content, temporal patterns, time-frequency landmarks, and amplitude variations. However, when attempting to quantify whether two audio signals match but are not exact copies, without normalization, these approaches may not adequately account for variations in the overall energy levels, frequency balance, and signal length between the query audio sample and the reference audio samples.

In some cases, audio processing systems have attempted to address this issue by applying normalization techniques that adjust the overall characteristics of the query audio sample itself. While these techniques can partially mitigate the effects of variations in loudness, overall frequency balance, and signal length they may not provide a comprehensive solution that takes into account the specific spectro-temporal pattern of the query audio sample.

Other approaches have focused on comparing audio samples using statistical methods such as dynamic time warping or hidden Markov models. These methods aim to align the query audio sample with the reference audio samples by considering the temporal relationships between different segments of the audio signals. However, these approaches may not provide accurate results when comparing audio samples with significant variations in loudness or energy levels, or with slight frequency shifts between spectral components.

Therefore, there is still a need in the art for an audio processing system for a comprehensive comparison approach to accurately compare a query audio sample with a database of multiple reference audio samples.

SUMMARY

It is an object of some embodiments to provide a system and a method for comparing audio signals or audio samples. Additionally or alternatively, it is an object of some embodiments to provide a system and a method for comparing audio samples with each other and/or with a plurality of other audio samples.

Some embodiments are based on recognizing that for a fair comparison, the audio samples need to be normalized. For example, the audio samples can be modified to be of the same length and loudness. Such a normalization modifies the audio sample itself and is referred to herein as an internal normalization. However, such an internal normalization is insufficient for a fair comparison of different audio samples. One of the reasons for such a deficiency is that the similarity of two audio samples depends on how the frequency content of an audio sample varies over time, which can also be described as comparing the spectro-temporal patterns between two audio samples. It is recognized that some sounds may have spectro-temporal patterns that are well-matched with a wide variety of other sounds. An extreme example of this is a white noise sound, which has energy at all frequencies and is constant across time, and may be well-matched to any sounds with constant frequency characteristics across time. Alternatively, a single brief click sound surrounded by silence may be well-matched to any other sound with a short duration in time, irrespective of the frequency content of the click. This issue persists even after normalizing sounds in terms of volume and length before comparison.

Hence, there is a need to normalize the audio comparison beyond the internal normalization of the audio samples. Such normalization is referred to herein as an external normalization that does not modify the audio sample itself but modifies the result of the comparison to make it more fair for different kinds of audio samples. The external normalization allows for the comparison of multiple audio queries to determine if a given query matched any of the reference samples without a need for a query-specific threshold. Using external normalization, a single threshold can be used to detect matches across multiple types of audio queries. In some embodiments, this external normalization determines a bias term based on a spectro-temporal pattern of a query audio sample and adds this bias term to the similarity scores produced by comparing the query audio sample with other reference audio samples. Hence, additionally or alternatively to normalizing the audio samples by internal normalization, some embodiments normalize the similarity scores by external normalization.

In some aspects, the techniques described herein relate to an audio processing system for comparing a query audio sample with a database of multiple reference audio samples using an external normalization, including: at least one processor; and memory having instructions stored thereon that, when executed by the processor, cause the audio processing system to: determine a bias term of the external normalization based on a spectro-temporal pattern of the query audio sample; compare the query audio sample with each of the reference audio samples to produce a similarity score for each comparison; combine the bias term with each of the similarity scores to produce normalized similarity scores; compare the normalized similarity scores with a threshold to produce a result of comparison; output the result of comparison.

In some aspects, the techniques described herein relate to an audio processing method for comparing a query audio sample with a database of multiple reference audio samples using an external normalization, wherein the method uses a processor coupled with stored instructions implementing the method, wherein the instructions, when executed by the processor carry out steps of the method, including: determining a bias term of the external normalization based on a spectro-temporal pattern of the query audio sample; comparing the query audio sample with each of the reference audio samples to produce a similarity score for each comparison; combining the bias term with each of the similarity scores to produce normalized similarity scores; comparing the normalized similarity scores with a threshold to produce a result of comparison; outputting the result of the comparison.

In some aspects, the techniques described herein relate to a non-transitory computer-readable storage medium embodied thereon a program executable by a processor for performing a method for comparing a query audio sample with a database of multiple reference audio samples using an external normalization, the method including: determining a bias term of the external normalization based on a spectro-temporal pattern of the query audio sample; comparing the query audio sample with each of the reference audio samples to produce a similarity score for each comparison; combining the bias term with each of the similarity scores to produce normalized similarity scores; comparing the normalized similarity scores with a threshold to produce a result of comparison; outputting the result of the comparison.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art that fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of the ordinary skills in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Figure 1:
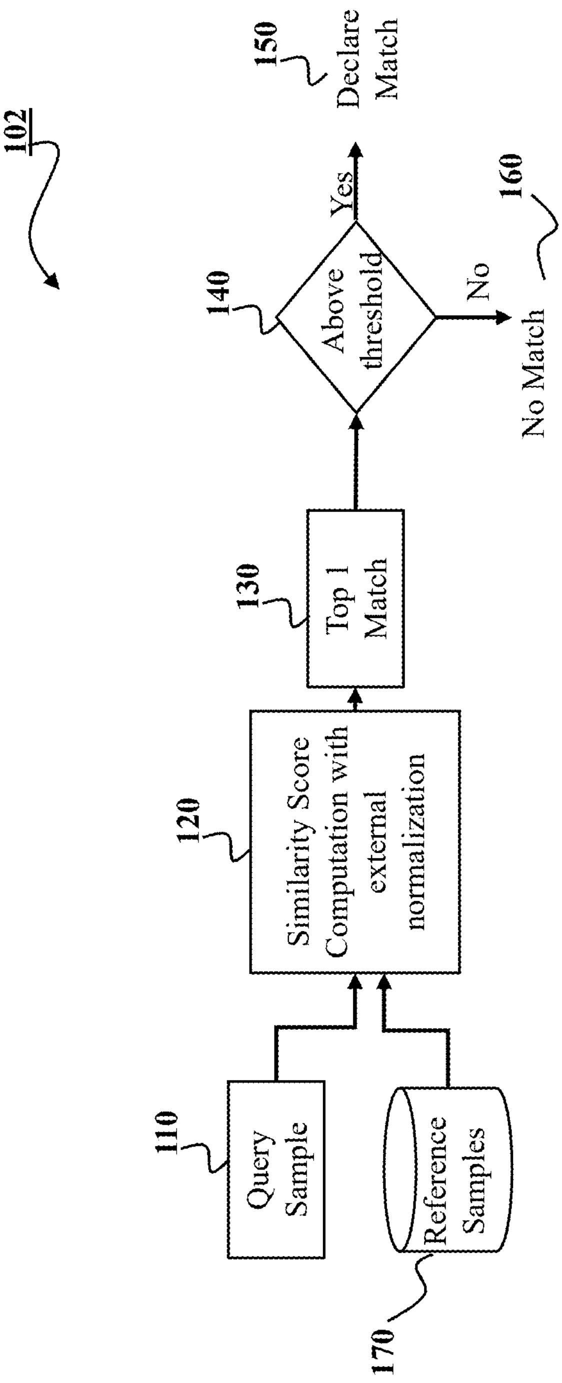
FIG. 1 shows a schematic of the operations of an audio processing system for comparing a query audio sample with a database of multiple reference audio samples using an external normalization according to some embodiments.

FIG. 1 shows a schematic of the operations of an audio processing system 102 for comparing a query audio sample 110 with a database of multiple reference audio samples 170 using an external normalization 120 according to some embodiments. In order to detect duplication of audio samples in a reference dataset, some embodiments frame the comparison as a copy-detection problem suitable for comparing multiple audio samples with each other. For each pair of a query q 110 and a reference sample r from the reference sample database 170 a similarity score 120 is computed, and this process is repeated for every sample in the reference sample database 170. We then find the top 1 match similarity 130 for query q, by finding the maximum similarity score across all samples in the reference sample database 170. Any queries q whose top-1 match similarity score 130 is above a certain threshold τ 140 are considered duplicates 150. Otherwise, the audio query 110 is considered unique 160.

Some embodiments are based on recognizing that for a fair comparison, the audio samples need to be normalized. For example, the audio samples can be modified to be of the same length, same loudness, same average frequency characteristics, etc. Such a normalization modifies the audio sample itself and is referred to herein as an internal normalization. However, such an internal normalization is insufficient for a fair comparison of different audio samples. One of the reasons for such a deficiency is that the similarity of two audio samples depends on how the frequency content of an audio sample varies over time, which can also be described as comparing the spectro-temporal patterns between two audio samples. It is recognized that some sounds may have spectro-temporal patterns that are well-matched with a wide variety of other sounds. An extreme example of this is a white noise sound, which has energy at all frequencies and is constant across time, and may be well-matched to any sounds with constant frequency characteristics across time. Alternatively, a single brief click sound surrounded by silence may be well-matched to any other sound with a short duration in time, irrespective of the frequency content of the click. This issue persists even after normalizing sounds in terms of volume, equalization and/or length before comparison.

Hence, there is a need to normalize the audio comparison beyond the internal normalization of the audio samples. Such normalization is referred to herein as an external normalization that does not modify the audio sample itself but modifies the result of the comparison to make it more fair for different kinds of audio samples. In some embodiments, this external normalization determines a bias term based on a spectro-temporal pattern of a query audio sample and adds this bias term to the similarity scores produced by comparing the query audio sample with other reference audio samples. Hence, additionally or alternatively to normalizing the audio samples by internal normalization, some embodiments normalize the similarity scores by external normalization.

Figure 2:
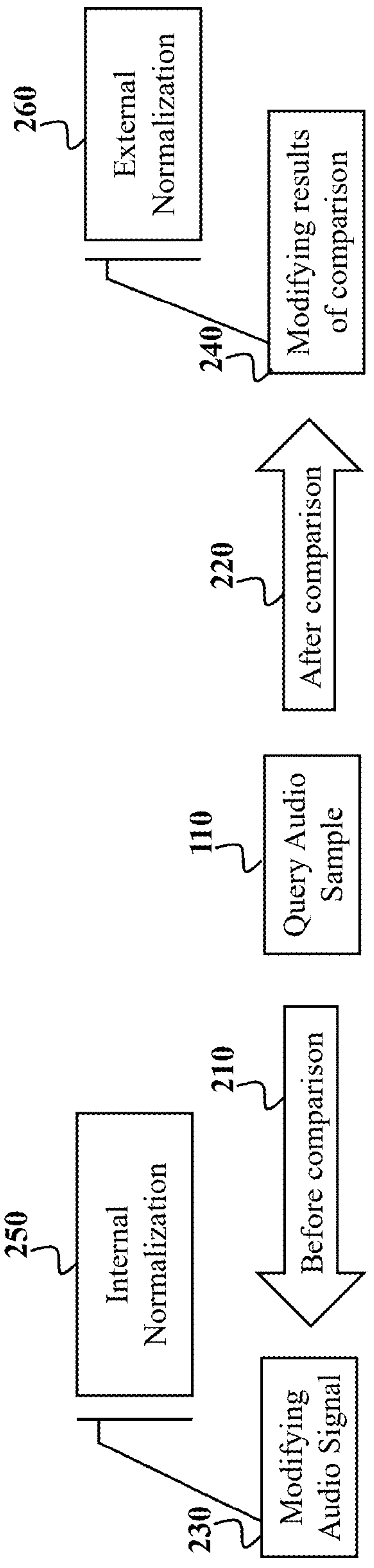
FIG. 2 shows a schematic illustrating the difference between external and internal normalization used by different embodiments.

FIG. 2 shows a schematic illustrating the difference between external and internal normalization used by different embodiments. The internal normalization 250 typically happens before the comparison 210 and includes modifying 230 the query audio sample 110. For example, some embodiments assume that the audio samples to be compared are of similar length in time, such that either padding with silence, or removing the end of one file to make them the same length can be considered "minor normalization." If one file is much longer, then some embodiments can split the longer file into multiple subfiles of the same length as the other file, or alternatively use a sliding window approach.

Another type of internal normalization includes applying a gain to the audio signals such that they are at the same loudness, where loudness can be measured using non-perceptual measures such as root mean square (RMS) level, or perceptually motivated loudness measures such as loudness units full scale. Some implementations also internally normalize audio signals in terms of their overall frequency content using equalization filters. Alternative embodiments do not do that because this type of internal normalization is often not beneficial for comparing sounds with highly varying content.

In contrast, the external normalization 260 happens after comparison 220 and modifies the results of comparison 240. Instead of modifying the audio files for a fair comparison, the external normalization adds a bias term to the similarity score determined as a function of a spectro-temporal pattern of the query audio sample.

Figure 3:
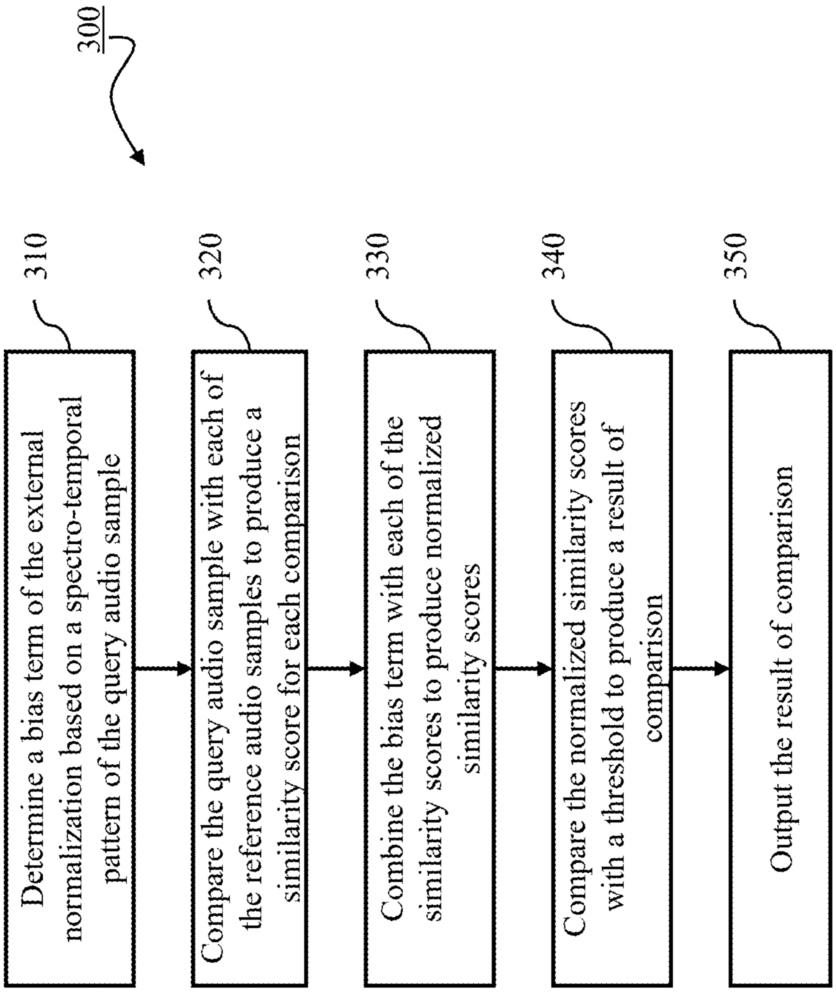
FIG. 3 shows a flowchart of a method performed by the audio processing system for comparing a query audio sample with a database of multiple reference audio samples using an external normalization.

FIG. 3 shows a flowchart of method 300 performed by the audio processing system 102 for comparing a query audio sample with a database of multiple reference audio samples using an external normalization. Method 300 is performed using at least one processor operatively coupled with a computer-readable memory having instructions stored thereon that, when executed by the processor, cause the audio processing system to perform the steps of method 300.

At step 310, method 300 determines a bias term of the external normalization based on a spectro-temporal pattern of the query audio sample. At step 320, method 300 compares the query audio sample with each of the reference audio samples to produce a similarity score for each comparison. At step 330, method 300 adds the bias term to each of the similarity scores to produce normalized similarity scores. At step 340, method 300 compares the normalized similarity scores with a threshold to produce a result of the comparison. At step 350, method 300 outputs the result of the comparison. Doing this in such a manner adjusts the results of the comparison in consideration of the specifics of the audio files.

Notably, this method can be used to compare multiple audio samples with each other when some of the audio samples are regarded as queries and other audio samples are regarded as reference sets. For each pair of a query q and a reference r, a similarity score is computed, resulting in a pairwise similarity matrix. Some embodiments follow a two-stage semi-manual approach consisting of a retrieval stage and a verification stage. In the retrieval stage, the embodiments retrieve the queries q whose top-1 match similarity score is above a certain threshold $\tau$.

The similarity score s(q, r) between query q and reference r is computed based on a similarity score between descriptors q, r$\in\mathbb{R}^d$ extracted from q and r, using a similarity score, including but not limited to a cosine similarity:

$$s(q, r) = sim(q, r) = \frac{q^T r}{\|q\|\|r\|}. \tag{1}$$

Some embodiments use a low-dimensional log mel spectrogram as a sample descriptor. This is a natural choice since most audio generative models employing latent diffusion extract the latent representation from a mel one, and using a low dimensional mel spectrogram helps to smooth out fine-grained details in the audio signal, which can make it difficult to detect near duplication in datasets. Some embodiments use a contrastive language audio pretraining (CLAP) descriptor, which is an embedding vector from a pre-trained deep neural network that aligns audio content with its semantic description. The choice of the CLAP model varies among embodiments. For example, some embodiments replace the CLAP model with other deep neural network audio models that provide an embedding vector for an audio signal.

Additionally, for each query q, some embodiments discount its similarity with each reference r using a bias term based on the average similarity between q and its K nearest neighbors in a background set of other samples, resulting in the normalized similarity score:

$$\hat{s}(q, r) = s(q, r) - \beta \cdot \text{bias}(q), \tag{2}$$

$$\text{bias}(q) = \frac{1}{K}\sum_{k=1}^{K} s(q, b_k),$$

where $b_k$ is the k-th nearest neighbor of q in the background set (based on the similarity of their descriptors), and $\beta$ a scalar. Therefore, in the retrieval stage, we retrieve the following set of queries:

$$\left\{q : \max_r \hat{s}(q, r) \geq \tau\right\}, \tag{3}$$

which are then inspected along with their top-1 matches in the verification stage.

Figure 4:
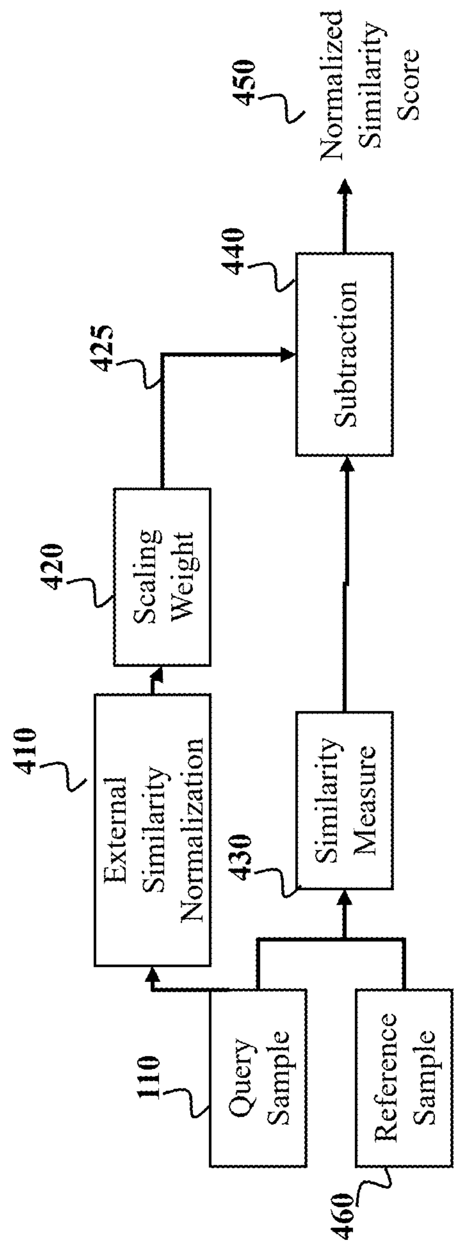
FIG. 4 shows a block diagram of a method for computing a normalized similarity score according to some embodiments.

FIG. 4 shows a block diagram of a method for computing a normalized similarity score according to some embodiments. The method compares query audio sample q 110 and reference audio sample r 460. In some implementations, the comparison can be mathematically described by equation (2) above.

The similarity measure 430 takes as input two audio signals 110 and 460 and outputs 430 a single number between 0 and 1, where 1 represents the fact that two audio signals are identical, and 0 means they have no similar features. The cosine similarity from equation (1) above is typically used as the similarity measure 430. Using only the raw output of the similarity measure to find potential matches, however, is not sufficient to find approximate matches in sets of real-world audio signals. By normalizing the score, the method prevents certain sounds (e.g., noise or clicks) from always being returned when searching for approximate matches in a data-driven manner.

The method normalizes the similarity score by subtracting 440 a bias term 425 to the output of a similarity measure 430. The bias term of the external normalization is determined 410 based on a spectro-temporal pattern of the query audio sample. For example, in some embodiments, the method extracts the spectro-temporal pattern of the query audio sample and processes the extracted spectro-temporal pattern with a predetermined analytical function to produce the bias term. Some examples of analytical functions used by some implementations are based on low-level characteristics of the audio signal such as zero-crossing rate or spectral flatness measures, which can be used as a measure of how noise-like an audio sample is. Thus, sounds with a higher zero crossing rate or spectral flatness could have a higher bias term 425, as in noise-like sounds, which typically have energy at most frequencies, to be more similar to a wide variety of sounds in terms of their spectro-temporal patterns. In different embodiments, the method processes the extracted spectro-temporal pattern with a learned function trained with machine learning to produce the bias term.

In some implementations, the bias term computed 410 by similarity normalization uses a background or training dataset having sounds that are different from those that are currently being searched for potential matches. The bias term is computed as the average similarity from a subset of the background dataset most similar to the query sound q, as was described in equation (2) where the subset consisted of the K nearest neighbors in the background dataset. It is useful for the background dataset to be diverse in terms of the spectro-temporal patterns of included sounds. If the background dataset over-represents sounds with certain spectro-temporal patterns, the similarity normalization may overly penalize sounds with spectro-temporal patterns similar to those that are overly represented in the background dataset. When combining the similarity measure computed by comparing query audio sample q and reference audio sample r, with the bias from similarity normalization, it is beneficial to have a scaling weight 420 to trade-off between the two components of the similarity score. This scaling weight is a nonnegative number specified by the user and allows one to trade-off between the importance of the raw similarity measure and the similarity normalization bias. In such a case where the background dataset lacks diversity, which would cause the bias from similarity normalization to be of lower quality, a smaller value for the scaling weight is selected to compensate for that deficiency. However, if the background dataset is extensive and diverse, a larger value for the scaling weight can be used. Some implementations use a scaling weight of 0.5.

Figure 5:
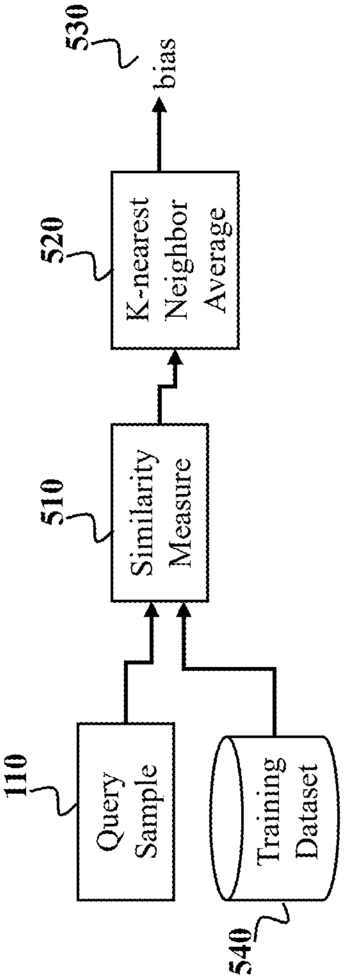
FIG. 5 shows a block diagram of a method for determining the bias term according to some embodiments.

FIG. 5 shows a block diagram of a method for determining the bias term 530 according to some embodiments. The embodiments compare the query audio sample 110 with a set of training audio samples 540 to produce a set of training similarity measures 510 and determine the bias term 530 based on an average of training similarity measures of K-nearest training audio samples 530. In some implementations, to determine the bias term, the audio processing system scales the average of training similarity measures 530 with a scalar to update the bias term. Some embodiments use a user-defined scalar, such as the scaling weight 420. In alternative embodiments, the scalar is a function of diversities of spectro-temporal patterns in the training audio samples. In some embodiments, this diversity is measured by comparing all sounds in the background dataset with each other in terms of spectro-temporal similarity measure 430, and then using the "spread" of these similarities to determine the scalar. Measures of spread are one or a combination of variance, standard deviation, median, and other statistical parameters.

Figure 6:
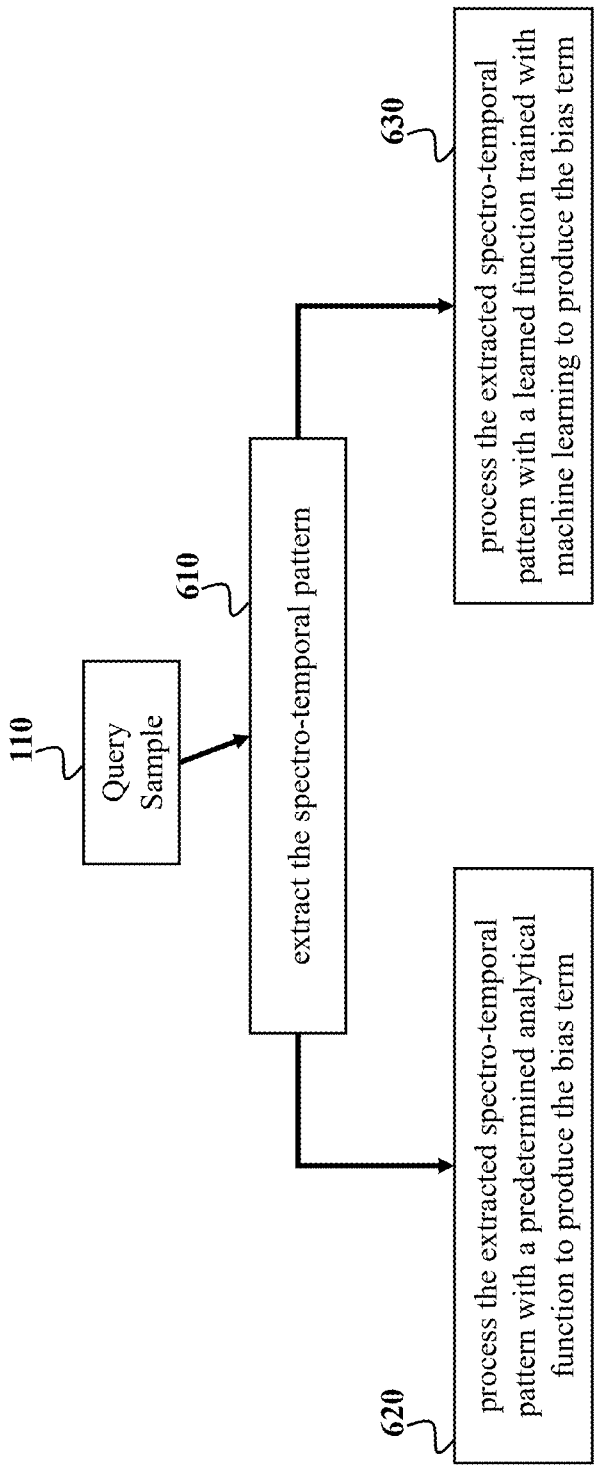
FIG. 6 shows a block diagram of a method for determining the bias term according to some embodiments.

FIG. 6 shows a block diagram of a method for determining the bias term according to some embodiments. The embodiments, to determine the bias term, extract 610 the spectro-temporal pattern of the query audio sample 110, and process the extracted spectro-temporal pattern with a predetermined analytical function 620 and/or a learned function trained with machine learning 630 to produce the bias term.

Examples of extracted spectro-temporal patterns include things like the onset times of different sound events in audio signals, different harmonic patterns, etc. These spectro-temporal patterns are typically represented using a time-frequency representation such as a spectrogram, and the frequency axis can also contain a perceptual grouping of frequencies, such as in a mel spectrogram. Features extracted from powerful deep learning models can also be used as the representation for the spectro-temporal pattern of an audio signal. Examples of the predetermined analytical function 620 include the spectral flatness or zero-crossing rate of the audio signal as a proxy for how noise-like an audio signal is. Examples of the learned function include a neural network and support vector machines trained with machine learning or a simple K-nearest neighbor average from a background set. For example, in some embodiments, the learned function is trained with supervised machine learning using bias terms determined based on averaged similarity measures 520 of training audio samples.

Figure 7A:
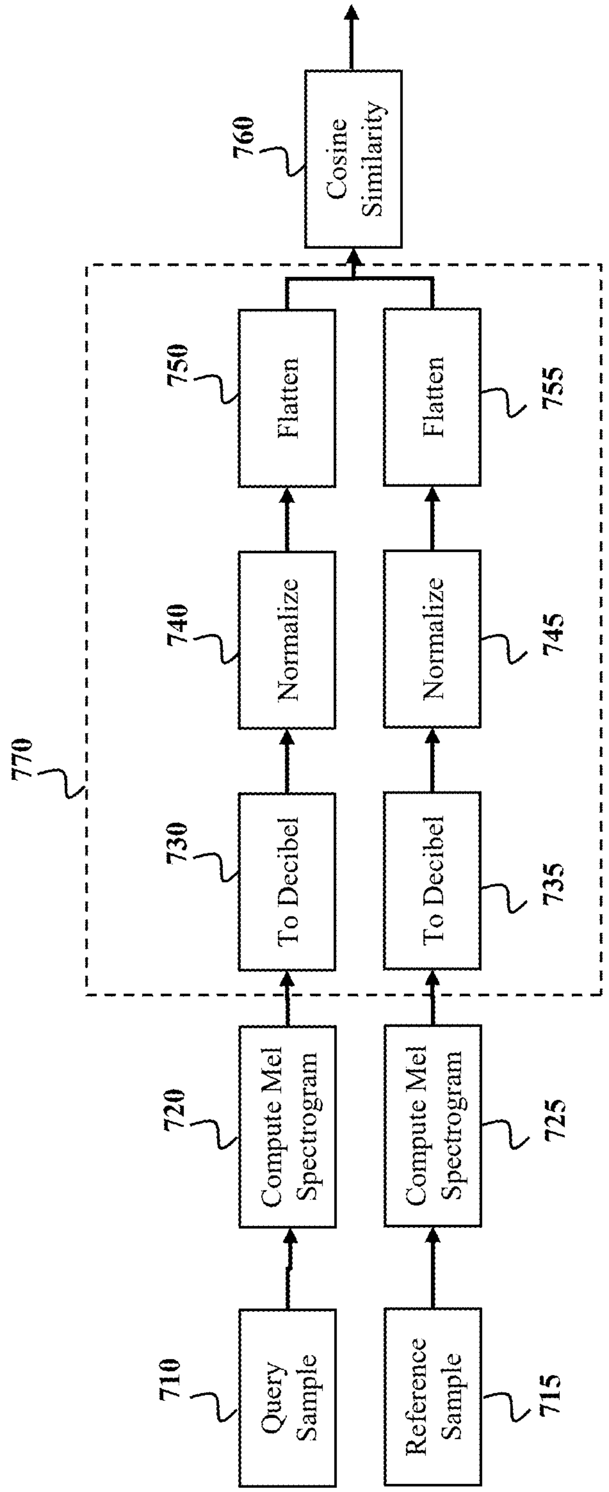
FIG. 7A shows a block diagram of a method for determining similarity measures of audio samples according to one embodiment.

FIG. 7A shows a block diagram of a method for determining similarity measures of audio samples according to one embodiment. The embodiment, to compare the query audio sample 710 with a reference audio sample 715, is configured to compute mel spectrograms 720 and 725 of the query audio sample 710 and the reference audio sample 715, respectfully, determine the similarity measure between the query audio sample and the reference audio sample based on a cosine similarity 760 of the computed mel spectrograms.

In some implementations, the embodiment is configured to normalize the mel spectrograms with an internal normalization 770. For example, the internal normalization 770 converts the mel spectrograms 720 and 725 to decibel scale 730 and 735, respectively and normalizes 740 and 745 such that the maximum bin in the mel spectrogram has a value of 0 dB, and all bin values below −40 dB are clipped to a value of −40 dB. Then, the embodiment flattens 750 and 755 from two-dimensional (containing time and frequency dimensions) mel spectrograms into one-dimensional vectors and computes the cosine similarity 760 between the two vectors as shown in equation (1).

Figure 7B:
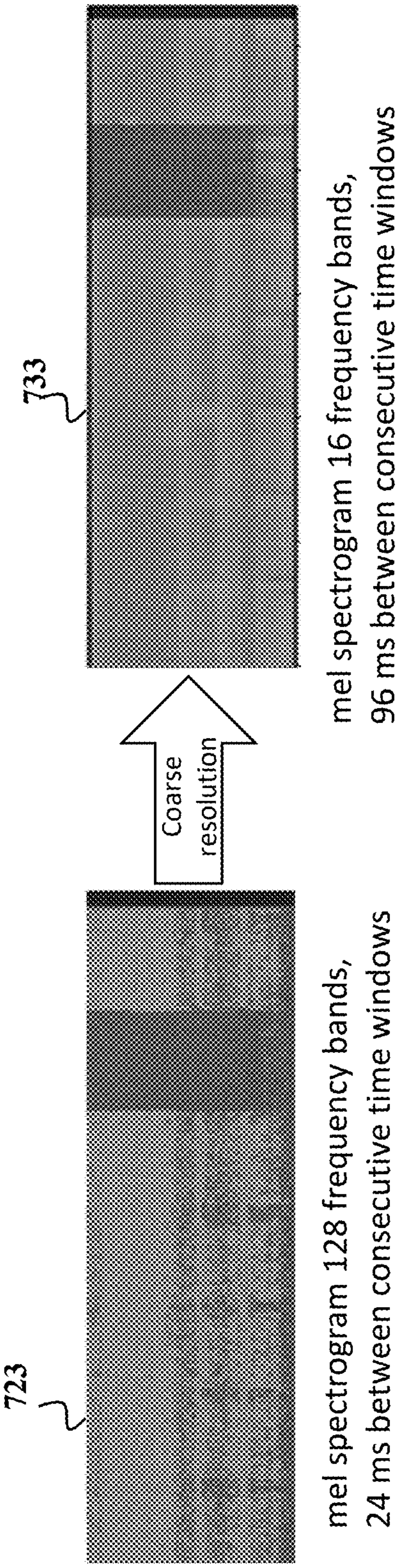
FIG. 7B shows a schematic of mel spectrograms with a coarse resolution employed by some embodiments.

FIG. 7B shows an example of mel spectrograms computed at typical resolution 723, as well as the coarse resolution employed by some embodiments 733. Some embodiments compute the mel spectrograms at a coarse resolution 733 with fewer than 20 mel frequency bands and spacing between consecutive time windows greater than 20 ms. Typically a mel spectrogram is computed using dozens or hundreds of frequency bins and a short time step (e.g., 20 ms) between time frames of the spectrogram 723. Instead, some embodiments use a coarse mel spectrogram 733, e.g., with only 16 mel bins and a 96 ms time step. This approach effectively smooths out many low-level details of the signal, which if present may reduce the ability to find matches with very small time or frequency shifts. For example, a slightly out-of-tune instrument, playing an identical piece of music may be different in terms of low-level frequency details compared to the in-tune version, and we would not be able to find these matches using a mel spectrogram at typical resolutions 723. However, using the coarse resolution mel spectrogram 733, these low-level details are smoothed out, which is more effective in finding approximate matches of spectro-temporal patterns in sound signals, such as similar frequency content or sound event onsets and offsets at approximately the same times.

Figure 8:
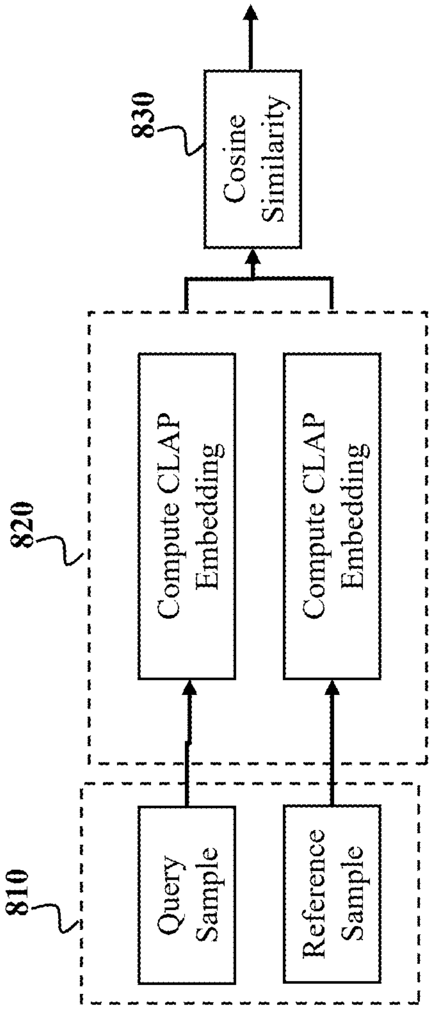
FIG. 8 shows a block diagram of a method for determining similarity measures of audio samples according to another embodiment.

FIG. 8 shows a block diagram of a method for determining similarity measures of audio samples according to another embodiment. This embodiment, to compare 810 the query audio sample with a reference audio sample, computes 820 embeddings of the query audio sample and the reference audio sample using a neural network and determines 830 the similarity measure between the query audio sample and the reference audio sample based on a cosine similarity of the computed embeddings.

For example, this embodiment can use a contrastive language audio pre-training (CLAP) model. This is a deep neural network that learns a common embedding space between sound signals and their text descriptions. The CLAP model takes as input an audio signal and returns a 512-dimensional vector. The embodiment can compute a similarity measure by computing the cosine similarity as in equation (1) using the CLAP embeddings computed for the query audio sample q and reference audio sample r.

In some embodiments, the database of multiple reference audio samples includes the query audio sample such that the reference audio samples are compared with each other. One embodiment uses the comparison to prune the database of multiple reference audio samples upon detecting duplications indicated by the result of the comparison. The pruned database of multiple reference audio samples can be used for training an audio deep-learning model more efficiently thereby improving the operation of the computers.

Figure 9:
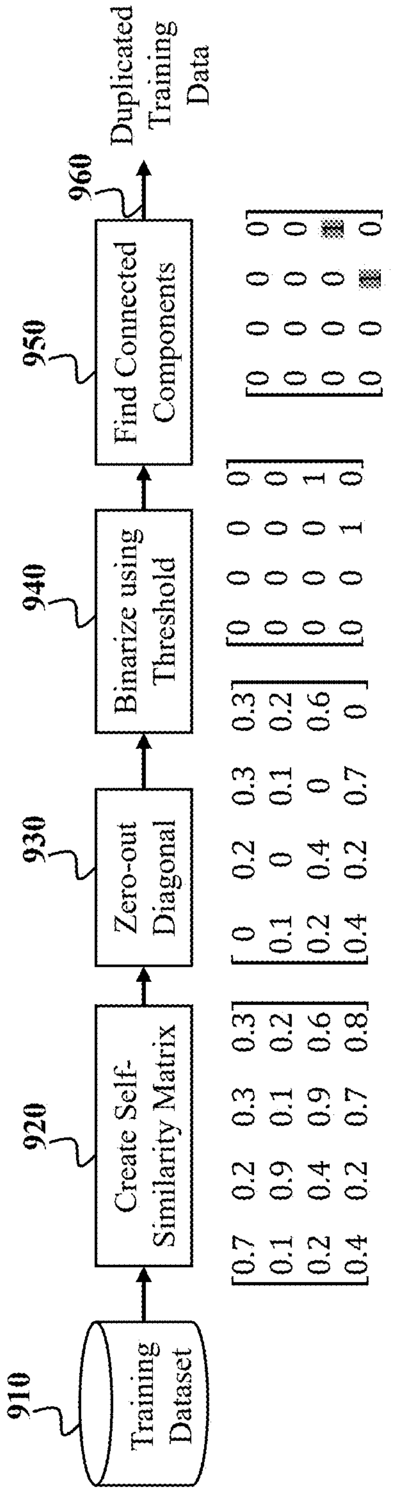
FIG. 9 shows a block diagram of a method for finding training data duplicates according to some embodiments.

FIG. 9 shows a block diagram of a method for finding training data duplicates according to some embodiments. The embodiments first take a training dataset 910 containing N audio signals and use the similarity score computation technique with external normalization using each of the N audio files as the query sample to obtain an N×N similarity matrix 920. The embodiments then zero out the diagonal elements 930 of this self-similarity matrix, which contains the similarity scores of comparing a sound with itself, as they contain no useful information because any sound should be considered as an approximate match with itself. The embodiments then binarize 940 the matrix 930 by setting to zero all elements of the similarity matrix below a threshold (typically around 0.5), and set to 1 all elements greater than or equal to the threshold, such that the N×N matrix is binary, i.e., only contains values of zero and one.

The embodiments find connected components 950 in the binary similarity matrix treated as a graph adjacency matrix, containing N nodes where a value of 1 in the (i,j) index of the similarity matrix indicates that two nodes are connected in a graph and a value of zero means they are not connected. Various methods can be to find 950 connected components in a graph, where each connected component can be considered a cluster of duplicated sounds. An example, the processing of the similarity matrix for the case when N=4 is also illustrated for each of the processing steps. In this example, there is one set of connected components in row/column 3 and 4 indicating that the sound files in the training set with indices 3 and 4 are duplicates.

Figure 10:
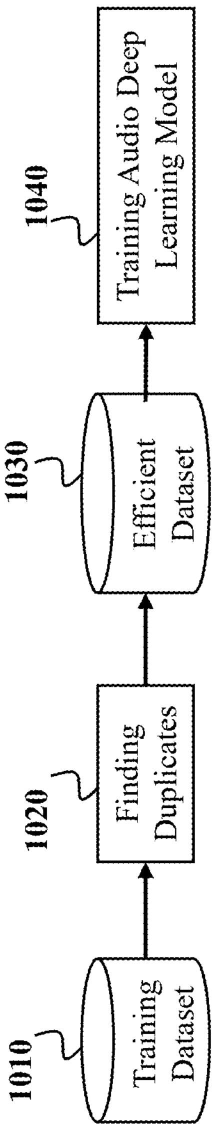
FIG. 10 shows a block diagram of a method for finding duplicates of audio samples to improve the training of an audio deep learning model using a large dataset according to some embodiments.

FIG. 10 shows a block diagram of a method for finding duplicates of audio samples to improve the training of an audio deep learning model using a large dataset 1010, e.g., scraped from the internet, according to some embodiments. Training 1040 a large audio deep learning model can sometimes take weeks or months at a considerable cost in terms of electricity usage, and make hardware unavailable for other training. Reducing the size of the training dataset to make it more efficient 1030 by removing duplicates 1020 can potentially speed up the training process. Furthermore, it has also been shown that removing duplicates in the training dataset can potentially improve model performance, and reduce privacy risks when training large deep-learning models.

The introduction of audio-generative models possessing the ability to generate realistic sound clips on demand from a text description has the potential to revolutionize how we work with audio. However, evidence from generative models used for text and images has shown extensive evidence of models that often replicate their training data, rather than generating novel text/images. However, how these results extend to audio-generative models is currently unknown. In this work, we propose a technique for detecting when an audio-generative model replicates its training data. Our approach uses score normalization to mitigate the issue that certain sounds may be inherently more similar to all other sounds. Detecting such replications could be useful for subsequently preventing future training data replication to ensure the training data remains private. Furthermore, our detection approach is also useful for finding near duplicates in large training datasets, where knowledge of these duplicates can enable more efficient training algorithms, potentially saving large compute costs.

The ability to generate novel digital data such as text, audio, and music using a trained machine learning model has recently exploded into public consciousness, often referred to as "Generative AI." These models are typically controlled by natural language and are easy to use. However, it is recognized that generative models don't always create novel data, and sometimes output exact or near exact replicas of data included in the training set. This can cause security concerns as training data may be private, and replications may violate copyright law. Research attempting to answer the technical question of how generative models may memorize and/or copy their training data has begun to appear in the case of images. However, audio generative models, such as those based on latent diffusion models, are less mature, and methods for robustly detecting replicated training data in audio models are an underexplored area.

Recent works on text-to-music generation have uncovered evidence of training data memorization for transformerbased models and the lack of novelty of generated samples from a diffusion-based model. However, those works do not account for the fact that some sounds (e.g., constant white noise) may be inherently more similar to all other sounds, and as such many of the matches they find are sounds that lack diversity (i.e., have stationary characteristics). Furthermore, methods such as audio fingerprinting are good at finding exact matches in short snippets of audio but may fail for approximate matches, e.g., in identifying training data replications in audio generative models that may have artifacts or other changes but remain perceptually very similar to training data samples.

Figure 11:
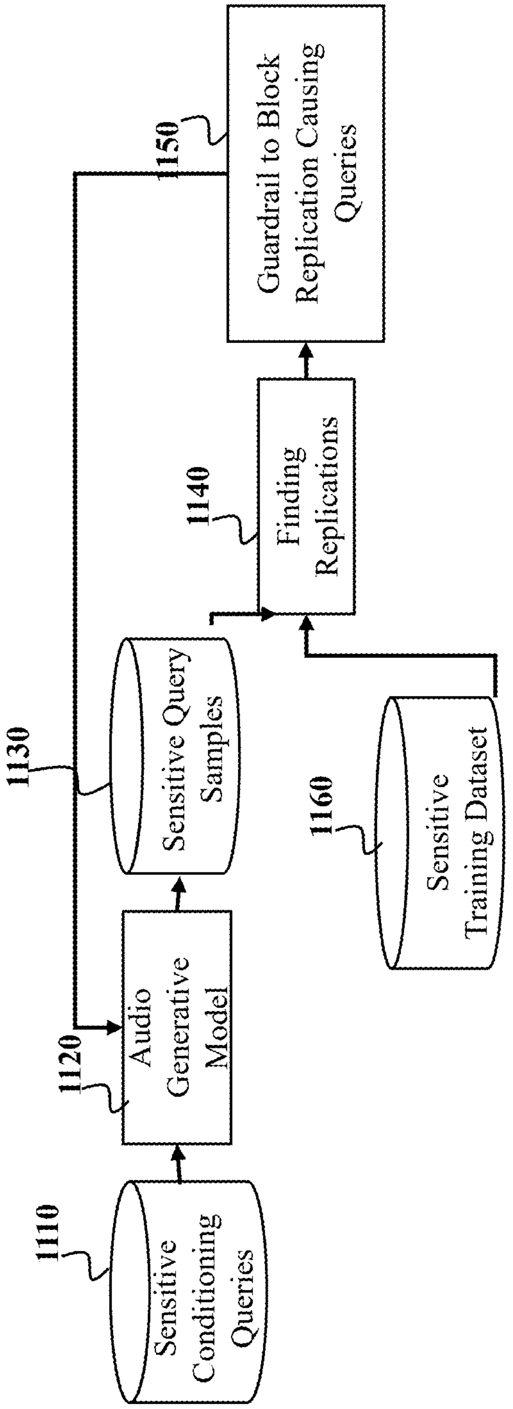
FIG. 11 shows a schematic of a method employing guardrails for preventing training data replication according to some embodiments.

FIG. 11 shows a schematic of a method employing guardrails 1150 for preventing training data replication 1140 according to some embodiments. These embodiments can be used for finding cases where a text-to-audio generative model 1120 replicates its training data 1160 to pre-emptively filter-out 1150 any text queries 1110 that may cause training data replication 1130.

Different embodiments detect duplication during training and/or execution of the audio-generative models. For example, one embodiment is configured to train an audio-generative model using the database of multiple reference audio samples; and detect duplication of audio samples generated by the audio-generative model and reference samples in the database of multiple reference audio samples. Additionally or alternatively, another embodiment is configured to execute an audio-generative model trained using the database of multiple reference audio samples to generate an audio sample; and transmit the generated audio sample unless the generated audio sample with the external normalization is a duplication of one or more of the reference audio samples.

Figure 12:
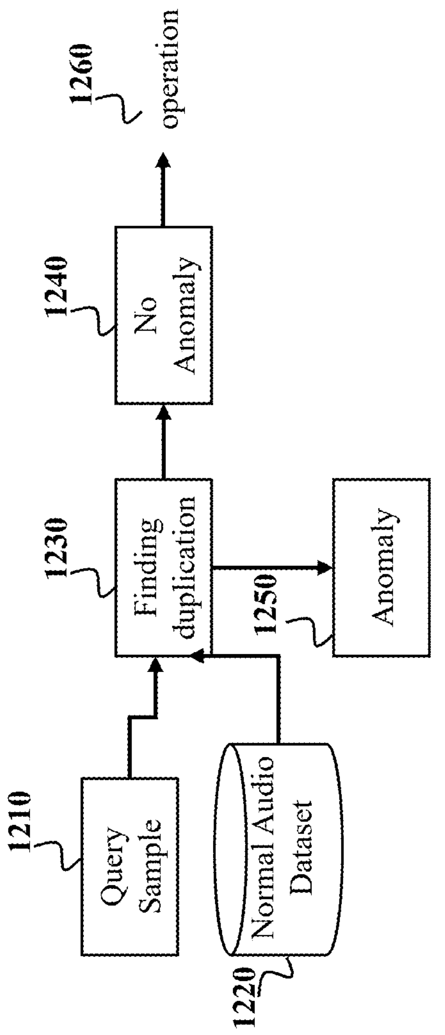
FIG. 12 shows a schematic of a method for performing an anomaly detection of the query audio sample based on the result of the audio comparison with the external normalization employed by some embodiments.

FIG. 12 shows a schematic of a method for performing an anomaly detection of the query audio sample based on the result of the audio comparison with the external normalization employed by some embodiments. The method compares a query audio sample 1210 with audio samples in the database representing normal, i.e., not anomalous, audio samples. If the duplicate 1230 of sample 1210 with at least one element of the database 1220 is found, the audio sample 1210 is considered no anomalies, and the desired operation 1260 is performed. Otherwise, sample 1210 is considered as anomalous 1250.

Figure 13:
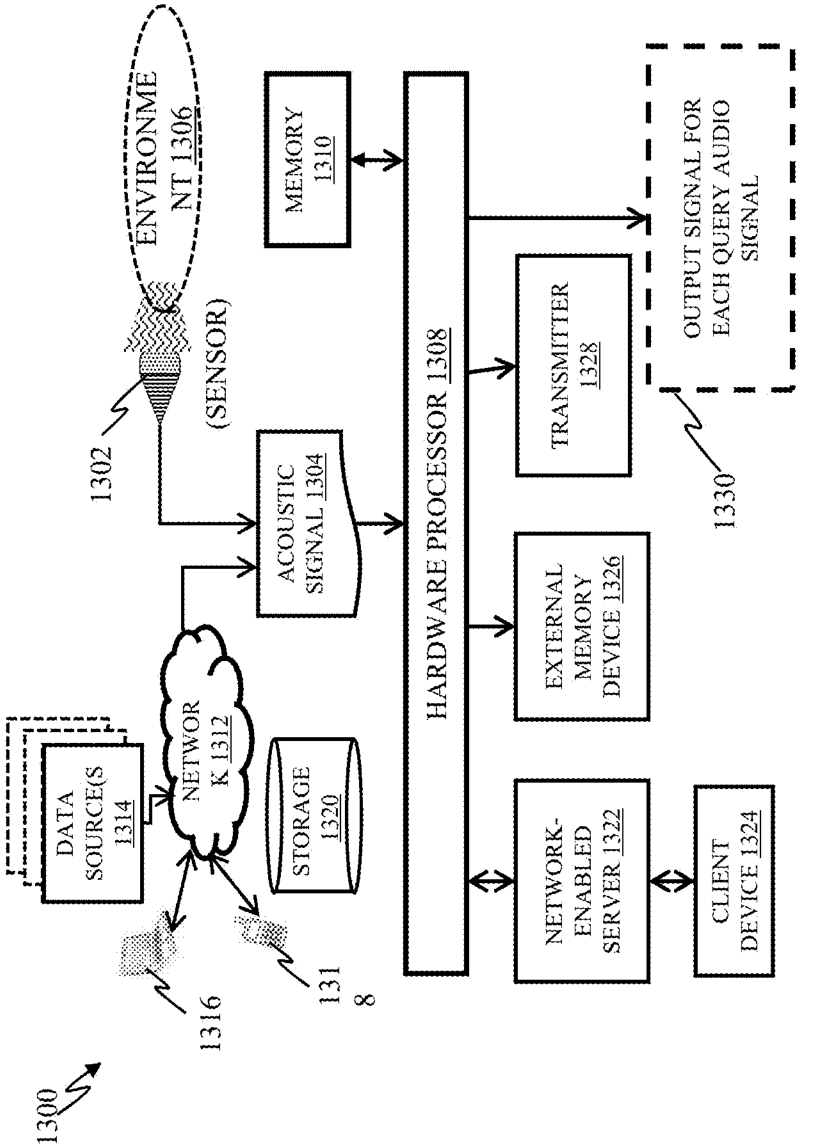
FIG. 13 is a detailed block diagram of the audio processing system according to some embodiments of the present disclosure.

FIG. 13 is a detailed block diagram 1300 of the audio processing system 102, according to some embodiments of the present disclosure. In some exemplar embodiments, the audio processing system includes a sensor 1302 or sensors, such as an acoustic sensor, which collects data including query audio sample 110 from an environment 1306.

The audio processing system 102 includes a hardware processor 1308 is in communication with a computer storage memory, such as a memory 1310. Memory 1310 includes stored data, including algorithms, instructions, and other data that may be implemented by the hardware processor 1308. It is contemplated the hardware processor 1308 may include two or more hardware processors depending upon the requirements of the specific application. The two or more hardware processors may be either internal or external. The audio processing system 102 may be incorporated with other components including output interfaces and transceivers, among other devices.

In some alternative embodiments, the hardware processor 1308 may be connected to a network 1312, which is in communication with one or more data source(s) 1314, a computer device 1316, a mobile phone device 1318, and a storage device 1320. The network 1312 may include, by non-limiting example, one or more local area networks (LANs) and/or wide area networks (WANs). The network 1312 may also include enterprise-wide computer networks, intranets, and the Internet. The audio signal processing system 1300 may include one or more client devices, storage components, and data sources. Each of the one or more client devices, storage components, and data sources may comprise a single device or multiple devices cooperating in a distributed environment of the network 1312.

In some other alternative embodiments, the hardware processor 1308 may be connected to a network-enabled server 1322 connected to a client device 1324. The hardware processor 1308 may be connected to an external memory device 1326, and a transmitter 1328. Further, an output for each target speaker may be outputted according to a specific user's intended use 1330. For example, the specific user intended use 1330 may correspond to displaying speech in text (such as speech commands) on one or more display devices, such as a monitor or screen, or inputting the text for each target speaker into a computer-related device for further analysis, or the like.

The data source(s) 1314 may comprise data resources for training the restoration operator 104 for a speech enhancement task. For example, in an embodiment, the training data may include acoustic signals of multiple speakers talking simultaneously along with background noise. The training data may also include acoustic signals of single speakers talking alone, acoustic signals of single or multiple speakers talking in a noisy environment, and acoustic signals of noisy environments.

The data source(s) 1314 may also comprise data resources for training the restoration operator 104 for a speech recognition task. The data provided by data source(s) 1314 may include labeled and un-labeled data, such as transcribed and un-transcribed data. For example, in an embodiment, the data includes one or more sounds and may also include corresponding transcription information or labels that may be used for initializing the speech recognition task.

Further, unlabeled data in the data source(s) 1314 may be provided by one or more feedback loops. For example, usage data from spoken search queries performed on search engines can be provided as un-transcribed data. Other examples of data sources may include by way of example, and not limitation, various spoken-language audio or image sources including streaming sounds or video, web queries, mobile device camera or audio information, webcam feeds, smart-glasses and smart-watch feeds, customer care systems, security camera feeds, web documents, catalogs, user feeds, SMS logs, instant messaging logs, spoken-word transcripts, gaming system user interactions such as voice commands or captured images (e.g., depth camera images), tweets, chat or video-call records, or social-networking media. Specific data source(s) 1314 used may be determined based on the application including whether the data is a certain class of data (e.g., data only related to specific types of sounds, including machine systems, entertainment systems, for example) or general (non-class-specific) in nature.

The audio processing system 102 may also include third-party devices, which may include any type of computing device, such as an automatic speech recognition (ASR) system on the computing device. For example, the third-party devices may include a computer device, or a mobile device 1318. The mobile device 1318 may include a personal data assistant (PDA), a smartphone, a smart watch, smart glasses (or other wearable smart device), an augmented reality headset, a virtual reality headset, a laptop, a tablet, a remote control, an entertainment system, a vehicle computer system, an embedded system controller, an appliance, a home computer system, a security system, a consumer electronic device, or other similar electronics device. The mobile device 1318 may also include a microphone or line-in for receiving audio information, a camera for receiving video or image information, or a communication component (e.g., Wi-Fi functionality) for receiving such information from another source, such as the Internet or a data source 1314. In one example embodiment, the mobile device 1318 may be capable of receiving input data such as audio and image information. For instance, the input data may include a query of a speaker into a microphone of the mobile device 1318 while multiple speakers in a room are talking. The input data may be processed by the ASR in the mobile device 1318 using the audio processing system 102 to determine a content of the query. The audio processing system 102 may enhance the input data by reducing noise in the environment of the speaker, separating the speaker from other speakers, or enhancing audio signals of the query and enabling the ASR to output an accurate response to the query.

In some example embodiments, the storage 1320 may store information including data, computer instructions (e.g., software program instructions, routines, or services), and/or data related to the neural network model of the audio processing system 102. For example, the storage 1320 may store data from one or more data source(s) 1314, one or more deep neural network models, information for generating and training deep neural network models, and the computer-usable information outputted by one or more deep neural network models.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware, or microcode, the program code or code segments to perform the necessary tasks may be stored in a machine-readable medium. A processor(s) may perform the necessary tasks.

The above-described embodiments of the present disclosure may be implemented in any of numerous ways. For example, the embodiments may be implemented using hardware, software, or a combination thereof. When implemented in software, the software code may be executed on any suitable processor or collection of processors, whether provided in a single computer or distributed among multiple computers. Such processors may be implemented as integrated circuits, with one or more processors in an integrated circuit component. However, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Therefore, it is the object of the appended claims to cover all such variations and modifications as come within the true spirit and scope of the present disclosure.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. An audio processing system for comparing a query audio sample with a database of multiple reference audio samples using an external normalization, comprising: a processor; and a memory having instructions stored thereon that, when executed by the processor, cause the audio processing system to:

determine a bias term of the external normalization based on a spectro-temporal pattern of the query audio sample, wherein to determine the bias term, the processor is configured to process the spectro-temporal pattern with at least one of: an analytical function or a learned function trained with machine learning;

compare the query audio sample with each of the reference audio samples to produce a similarity score for each comparison;

combine the bias term with the similarity score of each comparison to produce normalized similarity scores;

compare the normalized similarity scores with a threshold to produce a result of comparison; and output the result of comparison.

2. The audio processing system of claim 1, wherein, to determine the bias term, the processor is further configured to:

extract the spectro-temporal pattern of the query audio sample.

3. The audio processing system of claim 1, wherein the learned function is trained with supervised machine learning using bias terms determined based on averaged similarity measures of training audio samples.

4. The audio processing system of claim 1, wherein, to compare the query audio sample with a reference audio sample, the processor is configured to:

compute mel spectrograms of the query audio sample and the reference audio sample; and determine the similarity score between the query audio sample and the reference audio sample based on a cosine similarity of the computed mel spectrograms.

5. The audio processing system of claim 4, wherein the processor is configured to normalize the mel spectrograms with an internal normalization.

6. The audio processing system of claim 4, wherein the processor is configured to compute the mel spectrograms at a coarse resolution with fewer than 20 mel frequency bands and spacing between consecutive time windows greater than 20 ms.

7. The audio processing system of claim 1, wherein, to compare the query audio sample with a reference audio sample, the processor is configured to:

compute embeddings of the query audio sample and the reference audio sample using a neural network; and determine the similarity score between the query audio sample and the reference audio sample based on a cosine similarity of the computed embeddings.

8. The audio processing system of claim 1, wherein the database of multiple reference audio samples includes the query audio sample such that the reference audio samples are compared with each other, wherein the processor is further configured to:

prune the database of multiple reference audio samples upon detecting duplications indicated by the result of comparison.

9. The audio processing system of claim 8, wherein the processor is further configured to:

train an audio deep learning model using the pruned database of multiple reference audio samples.

10. The audio processing system of claim 1, wherein the processor is further configured to:

train an audio-generative model to generate audio samples using the database of multiple reference audio samples; and compare generated audio samples with the reference audio samples using the external normalization to detect if at least some of the generated audio samples are duplicates of audio samples contained in the database of multiple reference audio samples.

11. The audio processing system of claim 1, wherein the processor is further configured to:

execute an audio-generative model trained using the database of multiple reference audio samples to generate an audio sample; and transmit the generated audio sample unless the generated audio sample with the external normalization is a duplication of one or more of the reference audio samples.

12. The audio processing system of claim 1, wherein the processor is further configured to:

perform an anomaly detection of the query audio sample based on the result of comparison.

13. An audio processing method for comparing a query audio sample with a database of multiple reference audio samples using an external normalization, wherein the method uses a processor coupled with stored instructions implementing the method, wherein the instructions, when executed by the processor carry out at steps of the method, comprising:

determining a bias term of the external normalization based on a spectro-temporal pattern of the query audio sample, wherein the determining the bias term comprises processing the spectro-temporal pattern with at least one of: an analytical function or a learned function trained with machine learning;

comparing the query audio sample with each of the reference audio samples to produce a similarity score for each comparison;

combining the bias term with each of the similarity scores to produce normalized similarity scores;

comparing the normalized similarity scores with a threshold to produce a result of comparison; and outputting the result of the comparison.

14. The audio processing method of claim 13, further comprising:

computing mel spectrograms of the query audio sample and the reference audio sample, wherein the mel spectrograms are computed at a coarse resolution with fewer than 20 mel frequency bands and spacing between consecutive time windows greater than 20 ms; and determining the similarity score between the query audio sample and the reference audio sample based on a cosine similarity of the computed mel spectrograms.

15. A non-transitory computer-readable storage medium embodied thereon a program executable by a processor for performing a method for comparing a query audio sample with a database of multiple reference audio samples using an external normalization, the method comprising:

determining a bias term of the external normalization based on a spectro-temporal pattern of the query audio sample, wherein the determining the bias term comprises processing the spectro-temporal pattern with at least one of: an analytical function or a learned function trained with machine learning;

comparing the query audio sample with each of the reference audio samples to produce a similarity score for each comparison;

combining the bias term with each of the similarity scores to produce normalized similarity scores;

comparing the normalized similarity scores with a threshold to produce a result of comparison; and outputting the result of the comparison.

* * * * *